United States Patent [19]

Volman et al.

[11] 4,200,899
[45] Apr. 29, 1980

[54] OUTDOOR HIGH-VOLTAGE SWITCHGEAR

[76] Inventors: Mikhail Y. Volman, Lunny pereulok 2, kv. 14; Vladimir Y. Grinshtein, ulitsa Sverdlova 132, kv. 31, both of Odessa; Mikhail L. Zhukov, kvartal 3, dom 28, kv. 5, Kuibyshev; Ivan A. Kuchuk, ulitsa Engelsa 36, kv. 1, Odessa, all of U.S.S.R.

[21] Appl. No.: 917,306

[22] Filed: Jun. 20, 1978

Related U.S. Application Data

[63] Continuation of Ser. No. 705,892, Jul. 16, 1976, abandoned.

[51] Int. Cl.² ............................................. H02B 1/04
[52] U.S. Cl. .................................... 361/333; 361/429
[58] Field of Search ............... 200/48 R, 49; 361/331, 361/332, 333, 335, 429

[56] References Cited

U.S. PATENT DOCUMENTS

| | | | |
|---|---|---|---|
| 3,043,924 | 7/1962 | Johnson | 200/48 R |
| 3,215,897 | 11/1965 | Hertig | 361/333 |
| 3,364,398 | 1/1968 | Stipcevich | 361/429 |

FOREIGN PATENT DOCUMENTS

| | | | |
|---|---|---|---|
| 175932 | 2/1953 | Austria. | |
| 701328 | 12/1940 | Fed. Rep. of Germany. | |
| 708412 | 6/1941 | Fed. Rep. of Germany. | |
| 726017 | 8/1942 | Fed. Rep. of Germany. | |
| 753444 | 6/1949 | Fed. Rep. of Germany. | |
| 168216 | 5/1951 | Fed. Rep. of Germany | 361/333 |
| 895615 | 9/1953 | Fed. Rep. of Germany. | |
| 1051085 | 1/1954 | France. | |

*Primary Examiner*—Gerald P. Tolin
*Attorney, Agent, or Firm*—Fleit & Jacobson

[57] ABSTRACT

A high-voltage outdoor distribution installation, primarily of three-phase current and of a low-level design, comprises electric equipment having poles which are electrically interconnected and mounted on cross-arms of supports having legs secured to foundations, at least two poles of the electric equipment being arranged on each support. The foundations are in the form of unburied beams on the ground surface. At least two adjacent supports carrying the electrical equipment are combined into three-phase modules whose frames are formed by said supports and foundation beams coupling the legs of said support in the direction normal to the direction of the cross arm.

5 Claims, 6 Drawing Figures

OUTDOOR HIGH-VOLTAGE SWITCHGEAR

This is a continuation of application Serial No. 705,892, filed July 16, 1976, now abandoned.

The present invention relates to high-voltage substations and, more particularly, to high-voltage outdoor distribution installations. The main application of the invention is in three-phase a.c. substations with a voltage as high as 250 kv; the invention is also applicable in power stations and d.c. substations.

The continuing development of power engineering and the growing amount of power available for industrial and other needs are due to a regular increase in the number of transformer substations and their voltage. The general trend is to bring a substation closer to the consumer.

Of great importance in this connection is the problem of designing and constructing new, up-to-date outdoor distribution means with voltages of 35 and 110 kv, and even upwards of 220 kv.

There are known high-voltage outdoor distribution installations constructed from prefabricated electrical equipment units. Such installations do not require much time and labor for their construction and are highly reliable because their components are manufactured and assembled at a factory instead of a construction site where the assembly work level is at times inferior.

The size of electrical equipment units of outdoor distribution installations is determined by a number of factors. On the one hand, such units must be made as big as possible; on the other hand, such units must be small enough to meet manufacturing, transportation and installation requirements. As a rule, the optimum dimensions of such units are selected on the basis of transportation requirements.

Taking into account these requirements, as well as the dimensions of 35 and 110 kv apparatus and rated insulation and maintenance distances, the optimum structure of a 35 kv unit presupposes the provision of such a unit with electric equipment of a whole cell of a 35 kv distribution device, for example, a circuit breaker, line and bus switches, and current or voltage transformers; the optimum structure of a 110 kv unit presupposes, in the main, the provision of such a unit with one three-pole commutation means, for example, a circuit breaker or isolating switch.

In the known types of outdoor distribution installations, the frames of 35 and 110 kw units are spatial and have developed bases. In order to stretch the lead-in from the transmission line, also known as the service line wires, from terminal supports of an overhead transmission line to the line equipment of an outdoor distribution installation, the known types of outdoor distribution installations include either portal structures or special foundation anchors.

One of the major disadvantages of the conventional units resides in the fact that they cannot be used for constructing outdoor distribution installations of about 220 kv. With this voltage, it is impossible to install in one conventional unit (whose dimensions are intended to meet transportation requirements) even one three-pole 220 kv commutation device, considering the rated insulation distance. As regards the conventional 110 kv units, which are economical enough when making use of relatively simple circuitries of distribution installations, for example, bridge circuits, these units lose some of their advantages when using more elaborate circuits for the same class of voltage, including complicated circuits with one or more collecting bar systems. For these reasons, most of today's outdoor distribution installations, in particular, those with voltages of more than 35 kv, include supports for electric equipment, whose legs, cross-arms and foundations are manufactured and assembled separately. Such supports are then assembled from their prefabricated components on the construction site, after which electrical equipment poles are mounted thereon, said poles being supplied in bulk. In some cases, a distribution installation is assembled both from prefabricated units and bulk components.

It is an object of the present invention to increase the extent of prefabrication of outdoor distribution installations by combining poles of 220 kv electric equipment into units, to reduce the materials consumption, and make an outdoor distribution installation easier to assemble, which means that the invention aims at providing a 220 kv outdoor distribution installation that could be constructed from prefabricated and preassembled units. The invention also aims at solving a similar problem as regards 110 kv outdoor distribution installations particularly those of complicated circuitries (with collecting bars).

Thus, it is one of the main objects of the present invention to considerably expand the nomenclature and range of application of high-voltage outdoor distribution means constructed from prefabricated units, and substantially improve all economic factors involed in their construction, as compared to outdoor distribution installations of conventional types.

It is another object of the present invention to provide simple unit and support designs which would be universal for high-voltage outdoor distribution installations of different voltage classes, and which would be marked by minimized materials consumption and optimum dimensions for the purposes of manufacture, transportation and assembly.

It is still another object of the invention to provide supporting structures for high-voltage electrical equipment, including supports and foundations, which would ensure high operating reliability of the distribution installation and yet would have a minimum amount of structural components, which would make it possible to minimize the materials consumption and thus reduce construction costs of such unit supports and foundations, and, consequently, cut down the costs and speed up the construction of the outdoor distribution installation as a whole.

It is yet another object of the invention to minimize the area occupied by an outdoor distribution installation and thus reduce the amount of earthwork.

Finally, it is an object of the present invention to simplify the lead ins of overhead transmission lines connected to the line electrical equipment of an outdoor distribution installation and dispense with portal structures and foundation anchors of the known types by constructing overhead lines without portal structures.

The foregoing objects are attained by a high-voltage outdoor distribution installation, primarily of three-phase current and of a low level design, comprising electrical equipment, including line electrical equipment, having poles which are electrically interconnected and mounted on cross-arms of supports, said supports having legs secured to foundations, with the line electrical equipment being connected to a lead-in of a transmission line. According to the invention, each support carries at least two poles of electrical equipment, and the foundations are in the form of unburied beams arranged substantially on the level of the ground surface, at least two adjacent supports carrying the poles of the electrical equipment being combined into three-phase modules whose frames are formed by said supports and foundation beams coupling the legs of said supports in the direction normal to the direction of the cross-arms.

It is expedient that the frame of a three-phase module should comprise at least two unburied foundation beams, while the three-phase module itself should comprise at least two units, each being formed by a support with the electrical equipment poles rigidly secured on is cross-arm.

It is preferable that the frame of a three-phase module including the poles of line electrical equipment should have the wires of the lead-in of the overhead transmission line directly connected thereto.

It is advisable that the supports of at least one three-phase module should carry the poles of different pieces of the electrical equipment.

It is advisable that supports of at least one three-phase module should carry the poles of the same piece of the electrical equipment.

The construction of a 220 kv outdoor distribution installation from units of which each unit has two poles, for example, of different pieces of the electric equipment, and combining said units into three-phase modules on the site of assembly raise the mechanization level of constructing distribution installations of this class of voltage, reduce labor costs and consumption of materials, and simplify the maintenance.

A distribution installation of the proposed type makes it possible to introduce highly economical, utilized 220 kv substantions, which, in turn, makes it possible to dispense in many cases with intermediate transformer means.

It is advisable that the supports should be flat and composed, as a rule, of two legs and a cross-arm (the two-T configuration). This makes it possible to use such supports in distribution installations of different classes of voltage, mount poles of different types of electrical equipment on such supports, and arrange them in any desired direction. Such supports are simple to manufacture, do not require large areas in the course of assembly at a factory, and can be transported in packs. The assembly procedure on the construction site only consists in mounting such supports on foundations.

The supports of the proposed type are universal in that they can carry poles of different apparatus and thus make it possible to form different three-phase modules, depending on the circuitry and arrangement requirements.

The spatial frames, that are formed by the unit supports and unburied foundation beams, include a minimum of structural components, because their upper couplings are cross-arms on which there are mounted electrical equipment poles, whereas their lower couplings are foundation beams that extend-perpendicularly to the cross-arms, and their vertical elements are the legs of the supports, which legs make it possible to raise the electrical equipment to a safe height. For example, the frame of a three-phase module comprising six poles of 220 kv electrical equipment consists of three cross-arms, six supports, and two foundation beams.

Unlike the known designs, the proposed type of frame has a minimum of structural components and combines two functions, the function of being a rigid supporting structure for a complex of kinematically and electrically connected electrical equipment poles, and the function of a foundation. Thus, the spatial frame of each module comprises only a minimum of absolutely indispensable components. A distribution installation assembled from such modules in simple and has a clear-cut arrangement; it occupies a small area and minimizes earthwork in the course of its construction; it also reduces the construction costs and speeds up the construction work.

The connection of lead-in wires directly to the spatial frames makes it unnecessary to construct special portal structures or foundation anchors, whereby the design and construction of such lead-ins are considerably simplified.

Other objects and advantages of the present invention will become more apparent from the following detailed description of preferred embodiments thereof taken in conjunction with the accompanying drawings, wherein.

Referring now to the attached drawings, a first embodiment of the proposed high-voltage distribution installation is a 220 kv installation with bridge-type circuitry.

Figure 2:
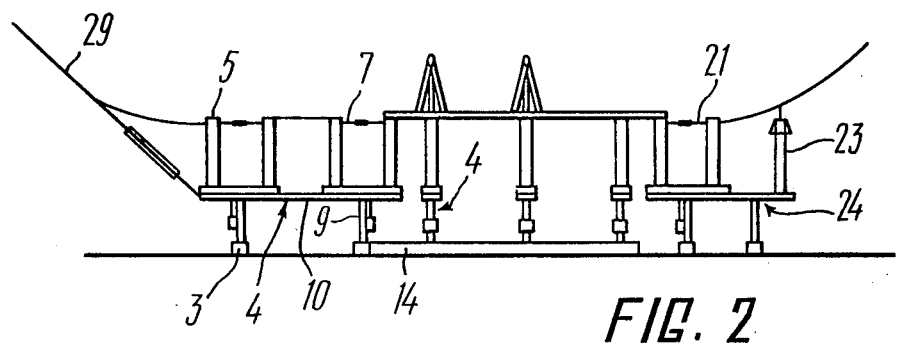
FIG. 2 is a side view of the installation of FIG. 1.
Figure 1:
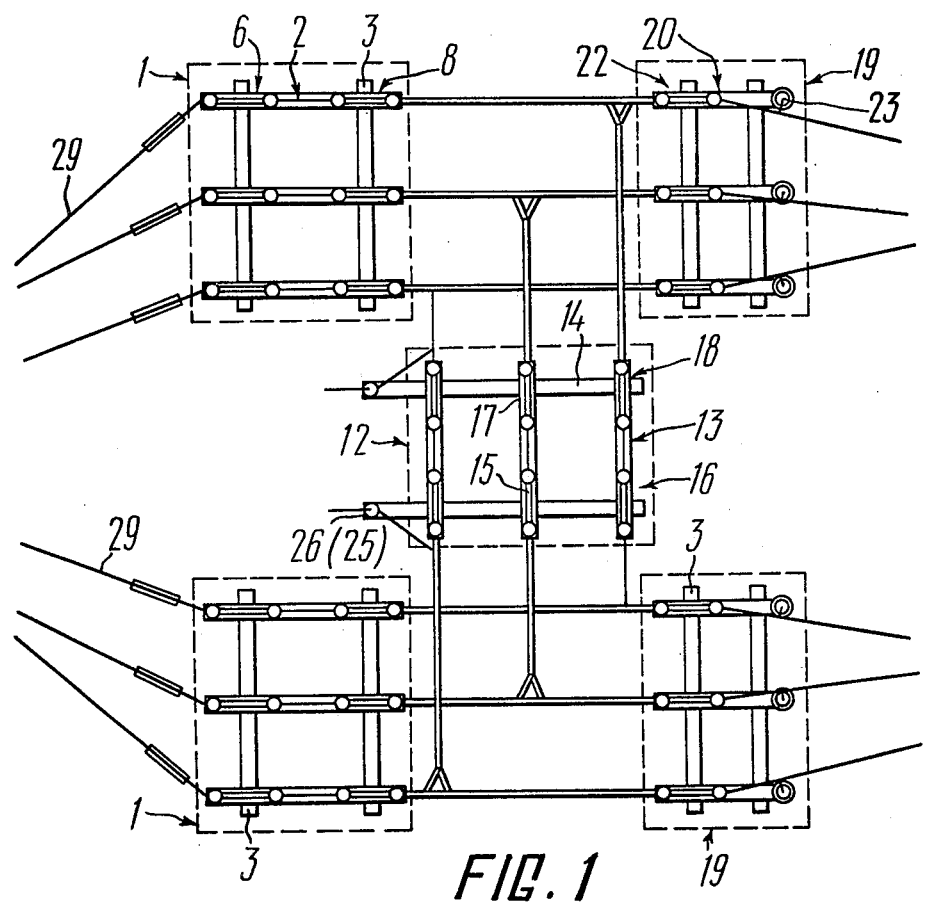
FIG. 1 is a plan view of a simplified embodiment of the proposed 220 kv distribution installation.
Figure 3:
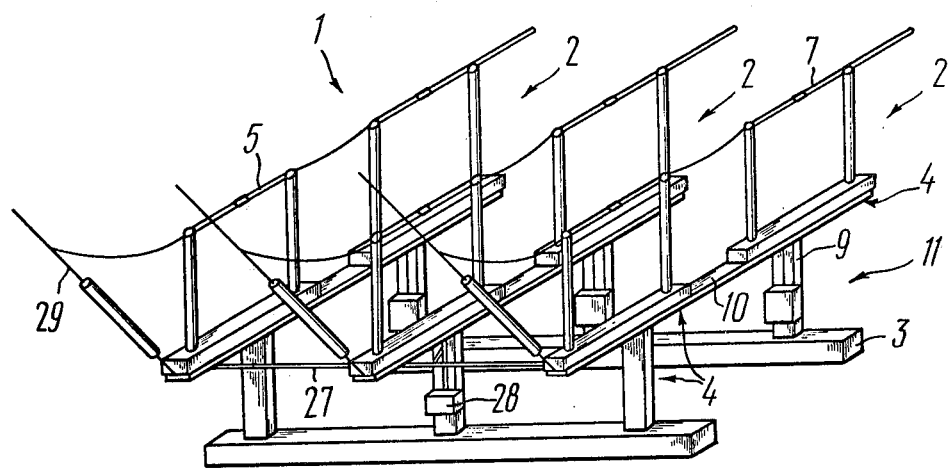
FIG. 3 is an axonometrical view of a three-phase module of the 220 kv distribution installation of FIGS. 1 and 2.

This outdoor distribution installation is shown in FIGS. 1, 2 and 3 and comprises two three-phase modules 1 composed of three units 2 and unburied foundation beams 3. Each unit 2 comprises a support 4, whereupon there are mounted a pole 5 of a line switch 6 and a pole 7 of an isolating switch 8. Three supports 4, comprising legs 9 and cross-arms 10, make up, together with the foundation beams 3, a spatial frame 11 of the module 1. Each module 1 contains all the electrical equipment of a line cell.

Electric equipment of a jumper cell is combined into a three-phase module 12 composed of three units 13 and foundation beams 14. Each unit 13 comprises one pole 15 of a line switch 16 and one pole 17 of an isolating switch 18. Electrical equipment of power transformer cells is contained in two three-phase modules 19, each comprising three units 20; each unit 20 includes one pole 21 of a line switch 22 and a discharger 23, which are mounted on supports 24, said supports 24 forming, together with the foundation beams 3, a spatial frame of the module 19.

The supports 4 and foundation beams 14 make up a spatial frame of the three-phase module 12. The embodiment under review makes it possible to mount separate electrical equipment poles on the foundation beams 14 of the module 12, if necessary, for example, pillars 25 with short circuiters 26. The spatial frames of the modules 19 and the module 12 are similar to the frames 11 of the modules 1.

The provision of a common foundation for a number of electric equipment units considerably improves the operating reliability of the equipment; for instance, it is clear from FIG. 3 that a kinematic coupling 27 of the line switch 6 is absolutely reliable, the poles 5 of said line switch 6 being controlled by a common drive 28.

The configuration and weight of the modules 1 make it possible to use said modules 1 also as anchors for stretching lead-in wires 29 between a terminal support (not shown) and the distribution installation, whereby it is no longer necessary to construct portal structures or foundation anchors. This makes it possible to bring the terminal support closer to the distribution installation and use said terminal support as a lightning arrester, whereby scattered individual lightning arresters can be dispensed with.

In the embodiment of a 220 kv distribution installation under review, each unit has two poles of different pieces of the electrical equipment, said poles being arranged one after the other. According to other circuitries and arrangements, it is possible to have poles of the same pieces of the electrical equipment in one unit.

The unburied foundations 3 and 14 (FIG. 2) are normally constructed from reinforced concrete and placed on the ground surface by using any known techniques; for example, they may rest on levelling beds of coarse sand, small-size stone chips or gravel. The use of unburied foundations is especially advantageous in cases of loose or marshy ground, or rock. These advantages are fully utilized by the present invention.

Figure 4:
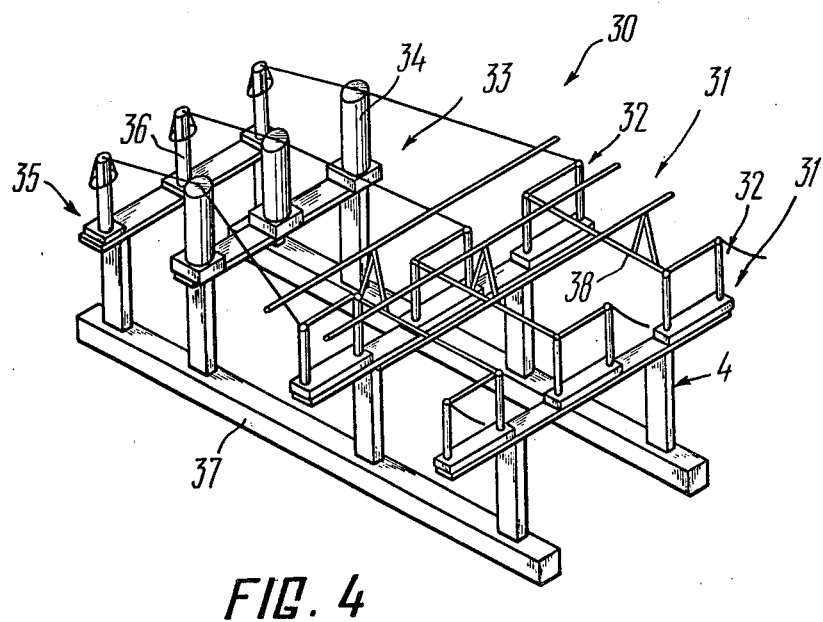
FIG. 4 is an axonometrical view of a three-phase module of a 110 kv distribution installation.

Another embodiment of the invention is a 110 kv outdoor distribution installation including a collecting bar system. FIG. 4 shows a module 30 of such an installation. The module 30 comprises two units 31 of bar disconnectors 32, a unit 33 of voltage transformers 34, and a unit 35 of dischargers 36. The units 31, 33 and 35 are provided with identical supports 4 which form, together with two foundation beams 37, a spatial frame of the module 30. As seen from FIG. 4, mounting the bar disconnectors 32 on the common foundation beams 37 improves the reliability of rigid collecting bars 38. FIG. 4 further points to the desirability and feasibility of producing three-phase modules comprising considerable amounts of electrical equipment (12 poles in the case under review). The proposed 110 kv distribution installation dispenses with portal structures, has a minimum of foundations and is marked by a clear-cut overall arrangement. In order to improve the arrangement and reduce the area occupied by the installation, the poles of the bar disconnectors 32 are placed in threes, one after another, in one unit 31.

Figure 5:
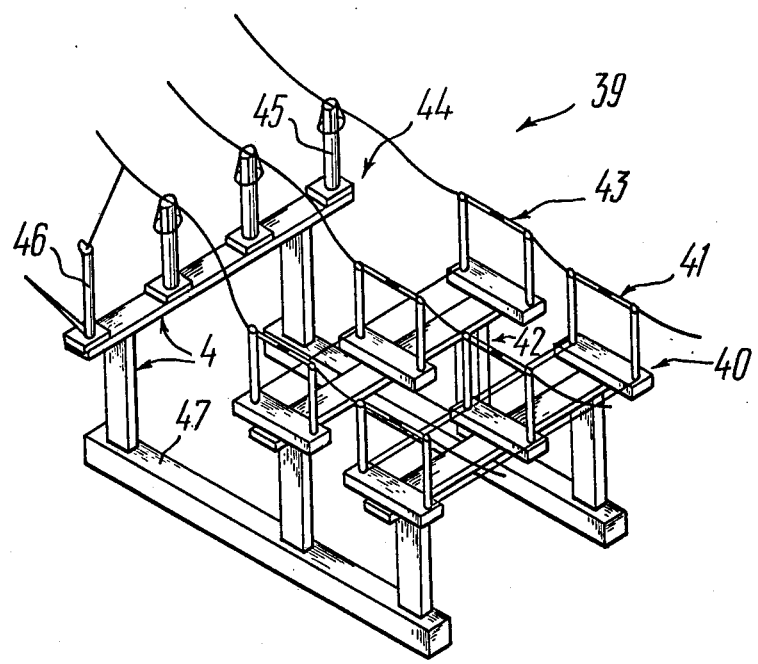
FIG. 5 is an axonometrical view of a three-phase module of an alternative embodiment of a 110 kv installation.

In a still another embodiment of the invention, which is a bridge-circuit, 110 kv outdoor distribution installation, all the electrical equipment of a power transformer cell is assembled in one three-phase module 39 (FIG. 5). Said module 39 comprises three units which include a unit 40 of a disconnector 41, a unit 42 of an isolating switch 43, and a unit 44 of dischargers 45 and a short-circuiter 46. The supports 4 of the units 40, 42 and 44 and foundation beams 47 make up a common spatial frame of the module 39. This example is indicative of the desirability and feasibility of constructing high-voltage outdoor distribution installations from standardized modules and units both with series and parallel arrangement of electrical equipment poles in the units.

While particular embodiments of the invention have been shown and described, various modifications thereof will be apparent to those skilled in the art and therefore it is not intended that the invention should be limited to the disclosed embodiments or to the details thereof, and a departure may be made therefrom within the scope and spirit of the present invention to provide a number of outdoor distribution installations having different circuitries and arrangements of their components.

The proposed high-voltage outdoor distribution installation can employ any known circuitry, the working voltage being in the main about 250 kv.

As indicated above, the preferred embodiments of the inventions illustrated in FIGS. 1 through 5 do not exclude the possibility of using the invention to evolve other alternative embodiments thereof which may prove advantageous under specific circumstances. For example, units can be combined into modules, and their supports can make up spatial frames not only through the use of unburied foundations, but also through the use of other components or bases. In some cases it may be preferable to manufacture units or supports at a convenient place in the vicinity of the construction site. Supports may be fabricated in a centralized manner; electrical equipment poles may be mounted on said supports on the construction site where an outdoor distribution installation is being built.

Figure 6:
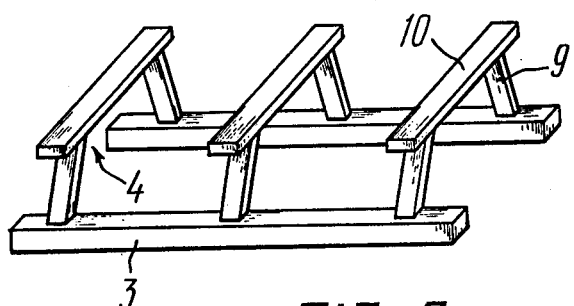
FIG. 6 is a view of an embodiment of a spatial frame of a three-phase module.

The legs of the supports may have different shapes and may be arranged at different angles. An example is shown in FIG. 6. In this embodiment of a spatial frame of a module with the supports 4, the legs 9 are inclined (the electrical equipment of the module is not shown). Likewise, the electrical equipment poles may be mounted on the cross-arms of the supports at any angle, depending upon specific requirements. The lead-in wires can be attached to the spatial frames of modules containing electrical equipment at any point of the frame, depending upon specific conditions. Cable power lines can also be connected.

As pointed out above, the present invention substantially reduces the amount of labor and materials put into the construction of numerous high-voltage outdoor distribution installations and speeds up their construction; the invention is also conducive to improved reliability of such installations; the invention facilitates transportation of equipment and cuts down transportation costs; finally, the invention helps to reduce the nomenclature of construction machinery and facilitates maintenance of high-voltage outdoor distribution installations.

What is claimed is:

1. A high-voltage outdoor distribution installation of the type having electrical equipment electrically interconnected, including electrical equipment for connection to lead-ins from an electrical transmission line, said installation comprising:
   (a) a plurality of three-phase modules being electrically interconnected including a module to be connected to lead-ins;
   (b) each said module including
      (i) a spatial frame and
      (ii) a plurality of electrically insulated, equipment mounting poles mounted on said spatial frame;
   (c) said spatial frame including:
      (i) a pair of spaced part, unburied foundation beams arranged substantially on the ground level and with no pilings or anchors penetrating the earth's surface, said pair of unburied foundation beams having no mechanical interconnections therebetween in the plane of said beams; and
      (ii) a plurality of supports attached to and supported by said pair of unburied foundation beams, each support including:

(1) a first vertically extending leg attached at its lower end to one of the pair of foundation beams, (2) a second vertically extending leg attached at its lower end at a correspondingly opposite point on the other one of the pair of foundation beams, and (3) a cross arm attached at spaced points to the upper ends of said vertically extending legs, bridging same so that each support is of generally an n-shape;

(d) electrical equipment formed by electrically insulated completely mounted poles; and (e) a portion of the supports, at least two, attached to said pair of unburied foundation beams being correlated with said electrically insulated poles and said electrically insulated poles, at least two, being directly mounted on said cross arms such that (i) for a three-phase configuration using two supports, at least three poles are directly mounted on and carried by the cross arm of each of said two supports, with the three electrical equipments mounted on the three poles on one of the cross arms being paired with the three electrical equipments mounted on the three poles on the other of the cross arms, each pair of said poles forming one phase of the three-phase configuration, and (ii) for a three-phase configuration with two electrically connected poles of the electrical equipment on each support, all the poles of the three-phase configuration are directly mounted and carried by the cross-arms of three supports, the poles mounted on each support being paired to form one phase of the three-phase configuration.

2. The high-voltage outdoor distribution installation, as claimed in claim 1, wherein said poles are rigidly affixed to the cross arms of said supports and said poles, said cross arms and said legs of each support are prefabricated as a unit.

3. The high-voltage outdoor distribution installation, as claimed in claim 1, wherein the lead-ins from said transmission line are mechanically attached directly to the spatial frame of a three-phase module.

4. The high-voltage outdoor distribution installation, as claimed in claim 1, wherein electrical equipment for performing identical electrical functions are mounted on the poles mounted on the same cross arm of the spatial framework forming a three-phase configuration.

5. The high-voltage outdoor distribution installation, as claimed in claim 1, wherein electrical equipment for performing different electrical functions are mounted on the poles mounted on the same cross arm of the spatial framework forming the three-phase configuration.

* * * * *